(12) United States Patent
Nath

(10) Patent No.: US 12,217,540 B2
(45) Date of Patent: Feb. 4, 2025

(54) SYSTEMS, APPARATUS, AND METHODS FOR OCCUPANCY TRACKING USING AUGMENTED REALITY

(71) Applicant: The Boeing Company, Arlington, VA (US)

(72) Inventor: Manoj Nath, Bangalore (IN)

(73) Assignee: The Boeing Company, Arlington, VA (US)

( * ) Notice: Subject to any disclaimer, the term of this patent is extended or adjusted under 35 U.S.C. 154(b) by 378 days.

(21) Appl. No.: 17/830,784

(22) Filed: Jun. 2, 2022

(65) Prior Publication Data

US 2023/0394874 A1 Dec. 7, 2023

(51) Int. Cl.
*G06V 40/16* (2022.01)
*B64D 11/00* (2006.01)

(52) U.S. Cl.
CPC .......... *G06V 40/172* (2022.01); *B64D 11/00* (2013.01); *G06V 40/161* (2022.01); *G06V 40/168* (2022.01)

(58) Field of Classification Search
None
See application file for complete search history.

(56) References Cited

U.S. PATENT DOCUMENTS

| 10,789,796 | B1* | 9/2020 | Munir | G06V 40/172 |
| 2016/0110833 | A1* | 4/2016 | Fix | G06Q 10/109 |
| | | | | 705/324 |
| 2019/0172168 | A1* | 6/2019 | Singh | G06Q 20/40145 |
| 2019/0177121 | A1* | 6/2019 | Shah | B66B 5/0012 |
| 2023/0289740 | A1* | 9/2023 | De Pano | H04L 51/216 |

OTHER PUBLICATIONS

Vox, How Snapchat's Filters Work, Jun. 28, 2016, https://www.youtube.com/watch?time_continue=15&v=Pc2aJxnmzh0&feature=emb_title, retrieved on Sep. 8, 2022, 3 pages.
Morozova, Anastasia, "Commercial Use Cases of AR Face Recognition and Facial Tracking Apps," Jasoren, https://jasoren.com/commercial-use-cases-of-ar-face-recognition-and-facial-tracking-apps/, retrieved on Jun. 22, 2022, 15 pages.

* cited by examiner

*Primary Examiner* — Dov Popovici
(74) *Attorney, Agent, or Firm* — Hanley, Flight & Zimmerman, LLC

(57) ABSTRACT

Systems, apparatus, and methods for occupancy tracking using augmented reality are disclosed herein. An example apparatus includes memory; instructions; and processor circuitry to execute the instructions to detect a first face in image data, the image data generated by image sensors in an environment and including at least a portion of the environment, the first face corresponding to a subject in the environment; define a first facial unit in the image data based on facial features associated with the first face; associate a first virtual object with the first facial unit in the image data; and determine an occupancy metric for the at least the portion of the environment based on the first virtual object and one or more other virtual objects associated with facial units defined in the image data.

20 Claims, 9 Drawing Sheets

SYSTEMS, APPARATUS, AND METHODS FOR OCCUPANCY TRACKING USING AUGMENTED REALITY

FIELD OF THE DISCLOSURE

This disclosure relates generally to augmented reality and, more particularly, to systems, apparatus, and methods for occupancy tracking using augmented reality.

BACKGROUND

Image recognition can be used to identify a subject (e.g., a human) captured in an image based on, for instance, recognition of facial feature(s) (e.g., eyes, lips) associated with the subject.

SUMMARY

An example apparatus includes memory; instructions; and processor circuitry to execute the instructions to detect a first face in image data, the image data generated by image sensors in an environment and including at least a portion of the environment, the first face corresponding to a subject in the environment; define a first facial unit in the image data based on facial features associated with the first face; associate a first virtual object with the first facial unit in the image data; and determine an occupancy metric for the at least the portion of the environment based on the first virtual object and one or more other virtual objects associated with facial units defined in the image data.

An example a non-transitory computer readable medium includes instructions that, when executed, cause processor circuitry to at least detect a first face and a second face in one or more frames of image data, the first face corresponding to a first subject in an interior of an air vehicle, the second face corresponding to a second subject in an interior of the air vehicle; define a first facial unit representing the first face in the one or more frames and a second facial unit representing the second face in the one or more frames; cause a first augmented reality marker to overlay the first facial unit in the one or more frames including the first facial unit and a second augmented reality marker to overlay the second facial unit in the one or more frames including the second facial unit; and determine an occupancy metric of the interior of the air vehicle based on the first augmented reality marker and the second augmented reality marker.

Another example apparatus includes memory; instructions; and processor circuitry to execute the instructions to define one or more facial units representing respective faces of subjects in an environment captured in one or more images based on facial features corresponding to the respective faces; cause a virtual object to be positioned over at least a portion of each facial unit in the one or more images; and determine an occupancy metric for the subjects in the environment based on the virtual objects.

BRIEF DESCRIPTION OF THE DRAWINGS

In general, the same reference numbers will be used throughout the drawing(s) and accompanying written description to refer to the same or like parts. The figures are not to scale.

Figure 1:
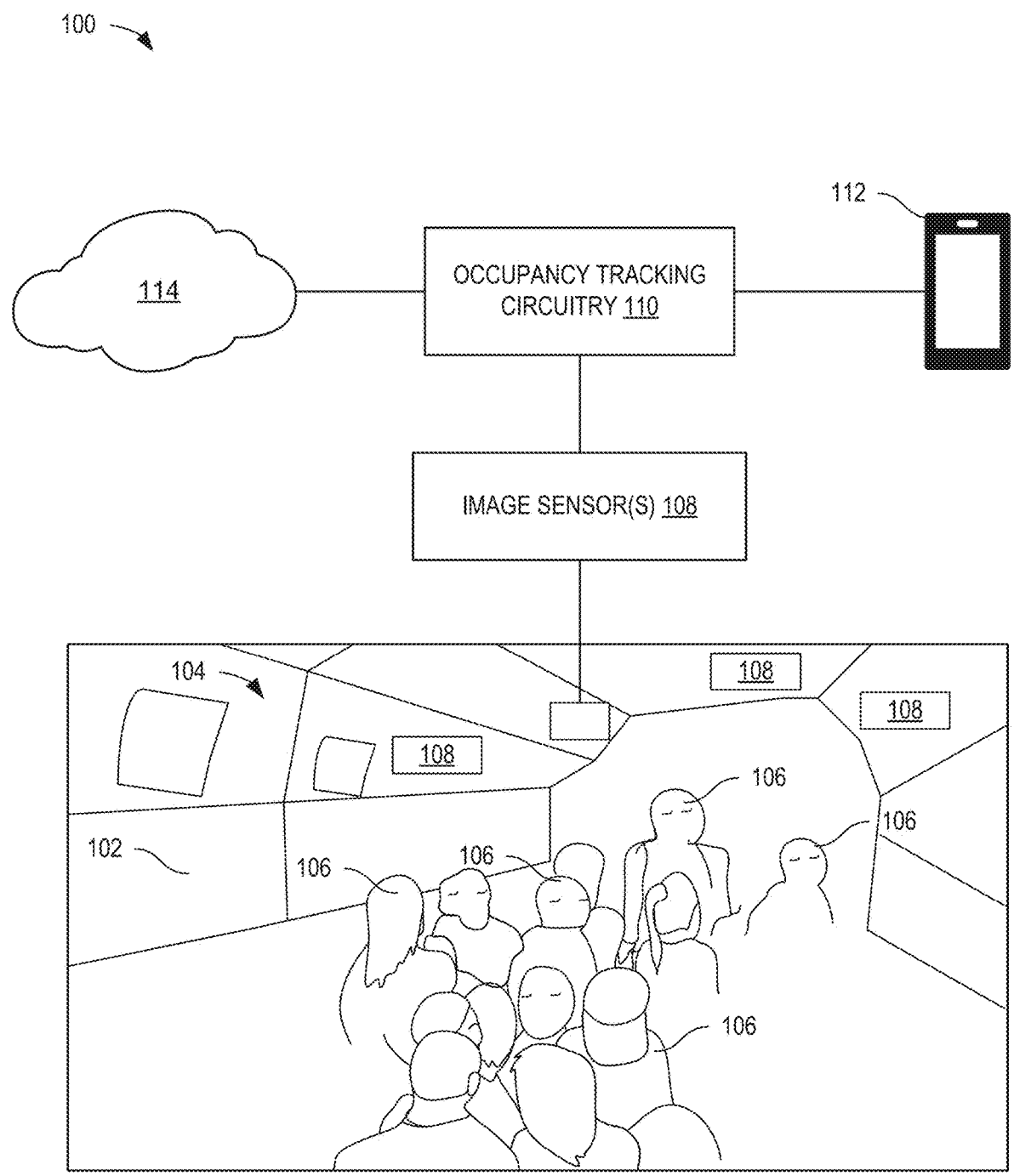
FIG. 1 illustrates an example system including occupancy tracking circuitry for tracking subjects in an environment in accordance with teachings of this disclosure.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/ or indirect communication through one or more intermediary components, and does not require direct physical (e.g., wired) communication and/or constant communication, but rather additionally includes selective communication at periodic intervals, scheduled intervals, aperiodic intervals, and/ or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Certain environments, such as an interior of an air vehicle, may have occupancy limits to prevent, for instance, a maximum weight at which the air vehicle can safely fly from being exceeded. However, environments such as a cabin of a rotorcraft may not have a defined number of seats for human passengers. Rather, occupants may sit on, for instance, a floor of the rotorcraft cabin. Thus, the occupancy of the rotorcraft may be difficult to accurately determine when passengers are in the cabin. In some instances, the crew of the aircraft may manually count the number of individuals as the individuals are boarding the rotorcraft. However, when a large number of individuals are boarding the aircraft at the same time and/or under stressful circumstances (e.g., fire, military operations), manual counting of the passengers may not be feasible and/or may result in erroneous values.

Disclosed herein are example systems, apparatus, and methods for determining occupancy of an environment based on subjects detected in the environment using recognition-based augmented reality. Examples disclosed herein analyze images (e.g., video streams, still images) captured of the environment to identify subject(s) in the images based on facial recognition. Some examples disclosed herein execute machine learning models to identify facial unit(s) representing face(s) of subject(s) captured in the images based on detection of facial features such as eyes, nose, ears, an outline of a chin, etc. for each subject. In some examples, the subjects captured in the images include subjects who are known to occupy the environment, such as a crew of an aircraft. Examples disclosed herein recognize (e.g., predict) that the facial units correspond to the known subjects by comparing facial features in the images to calibration or reference image data of the known subjects. Examples disclosed herein classify the facial units captured in the images as representing known subjects or unknown subjects.

Examples disclosed herein cause a virtual object (e.g., a three-dimensional graphical object) to overlay, align with, or be positioned over at least a portion of each facial unit identified in an image (e.g., frames of a video stream). In some examples, virtual objects having different characteristics or properties (e.g., different size, shape, color, etc.) are used for facial units classified as associated with known subject and facial units classified as associated with unknown subjects. Examples disclosed herein determine metrics such as a total attendance of subjects in the environment and an occupancy percentage based on the virtual objects generated for the images. For instance, examples disclosed herein can distinguish between counts of known crew members in a cabin of a rotorcraft and passengers other than the crew based on the types of virtual objects generated for the image. Examples disclosed herein can track subjects within the environment based on facial recognition analysis to prevent, for instance, the same subject from being counted more than once in images capturing the environment from different fields of view and/or images collected over time.

Examples disclosed herein provide for efficient and accurate determination of metrics such as occupancy based on the use of augmented reality. For example, the virtual objects serve as distinct representations or proxies of the faces in the image data. Examples disclosed herein efficiently use the virtual objects to track and count subjects in the environment.

Although examples disclosed herein are discussed in connection with occupancy of air vehicles such as a rotorcraft, examples disclosed herein can be used to track subjects in other environments, such as a building (e.g., a concert hall with a standing room only area).

FIG. 1 illustrates an example system 100 for subject occupancy tracking in an environment in accordance with teachings of this disclosure. In the example of FIG. 1, the environment includes a cabin 102 of a rotorcraft 104. For illustrative purposes, only a portion of the rotorcraft 104 including the interior or the cabin 102 of the rotorcraft 104 is shown in FIG. 1. In the example of FIG. 1, a plurality of subjects 106 (i.e., passengers) are in the cabin 102 of the rotorcraft 104.

The example system 100 of FIG. 1 includes one or more image sensor(s) 108. The image sensor(s) 108 can include, for example, video camera(s) that output video feed(s) or stream(s) including video frames. In some examples, the image sensor(s) 108 can include camera(s) to generate still images. The image sensor(s) 108 can be located at one or more locations relative to the rotorcraft cabin 102. For instance, one or more image sensors 108 can be located at a door of the cabin 102 of the rotorcraft 104 to generate image data as the subject(s) 106 enter the cabin 102. The image sensor(s) 108 generate image data (e.g., video frames) capturing portion(s) of the cabin 102 and/or the surrounding environment within a respective field of view of the image sensors 108. In some examples, a subject 106 is in the field of the view of two or more of the image sensor(s) 108 and, thus, is captured in the images generated by the respective image sensors 108.

In the example of FIG. 1, the image sensor(s) 108 are communicatively coupled to occupancy tracking circuitry 110. The image sensor(s) 108 transmit the image data to the occupancy tracking circuitry 110 (e.g., via wired or wireless communication protocols). As disclosed herein, the occupancy tracking circuitry 110 analyzes the image data to detect the subject(s) 106 captured in the image data using facial recognition, classify the detected face(s) as associated with known or pre-identified subject(s) (e.g., crew members, subjects previously captured in the image data) or unknown or non-pre-identified subject(s), generate virtual object(s) representing the subject(s) based on the classifications, and determine metrics such an occupancy of the rotorcraft 104 at a given time based on the virtual object(s). The example occupancy tracking circuitry 110 of FIG. 1 uses computer vision to detect face(s) of the subject(s) 106 in the image data (e.g., video feed) and augmented reality to generate virtual objects that mark (e.g., tag) the subject(s) 106 identified in the image data. The example occupancy tracking circuitry 110 of FIG. 1 uses the virtual objects or markers to determine occupancy of rotorcraft cabin 102 based on counts of the virtual objects generated for the image data generated over time.

In the example of FIG. 1, the occupancy tracking circuitry 110 is implemented by processor circuitry of one or more user devices 112 (e.g., a personal computing device such as an electronic tablet or laptop, a smartphone, a computer carried by the rotorcraft 104, etc.) and/or one or more cloud-based device(s) 114 such as one or more servers, processors, and/or virtual machines. In some examples, some of the analysis performed by the occupancy tracking circuitry 110 is implemented by the cloud-based device(s) 114 and other parts of the analysis are implemented by processor(s) of the one or more user devices 112.

Figure 2:
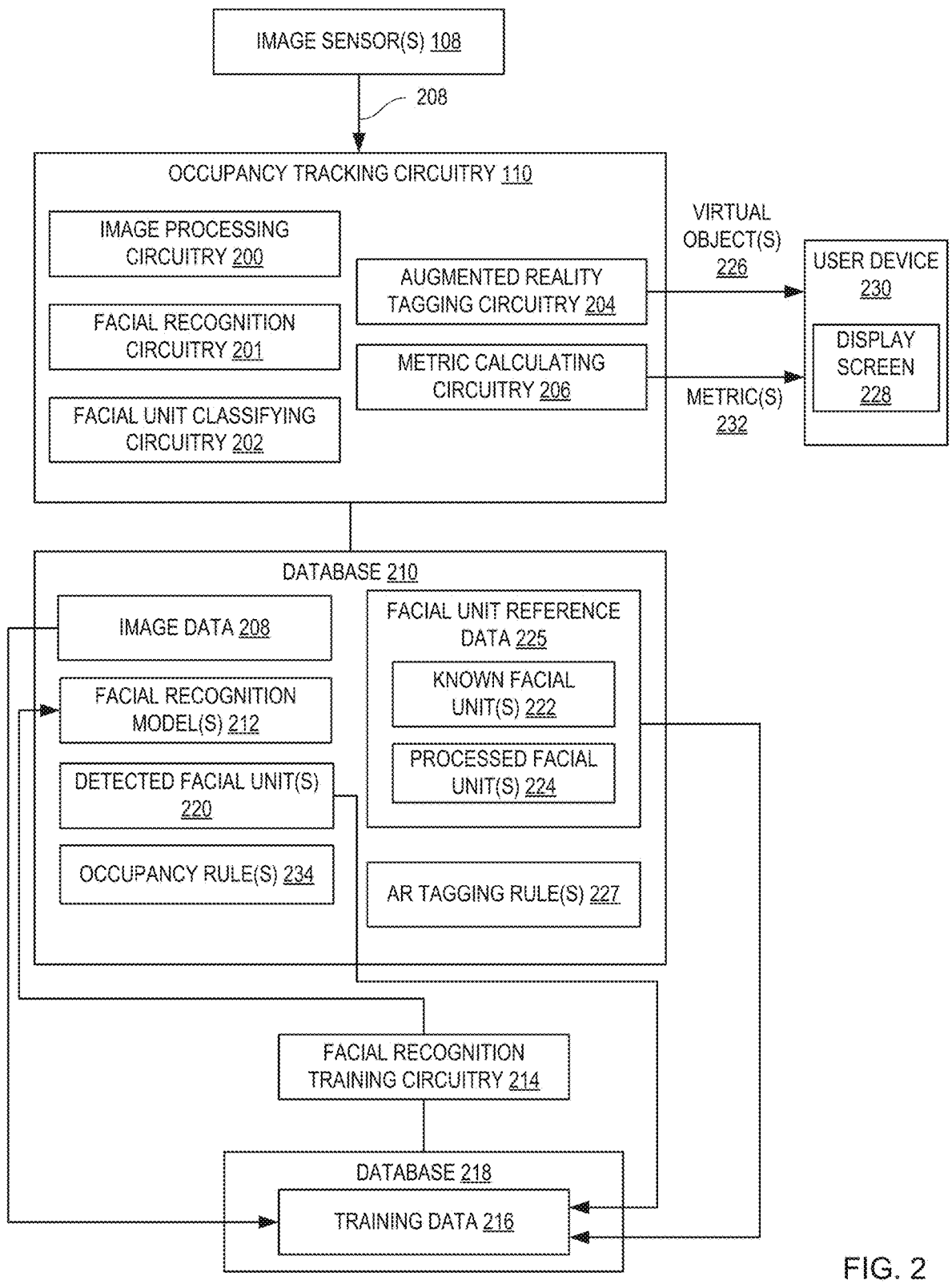
FIG. 2 is a block diagram of the example occupancy tracking circuitry of FIG. 1.

FIG. 2 is a block diagram of the example occupancy tracking circuitry 110 of FIG. 1 to identify subjects in an environment, such as the subject(s) 106 in the cabin 102 of the rotorcraft 104 of FIG. 1, and to generate metric(s) (e.g., occupancy, attendance) based on the identification of the subjects. The occupancy tracking circuitry 110 of FIG. 2 may be instantiated (e.g., creating an instance of, bring into being for any length of time, materialize, implement, etc.) by processor circuitry such as a central processing unit executing instructions. Additionally or alternatively, the occupancy tracking circuitry 110 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The example occupancy tracking circuitry 110 of FIG. 1 includes image processing circuitry 200, facial recognition circuitry 201, facial unit classifying circuitry 202, augmented reality tagging circuitry 204, and metric calculating circuitry 206.

In the example of FIG. 2, image data 208 (e.g., video frame(s), still image(s)) generated by the image sensor(s) 108 is transmitted to the occupancy tracking circuitry 110 via one or more wired or wireless communication protocols. This transmission may be substantially in real-time as the data is generated (as used herein "substantially real time" refers to occurrence in a near instantaneous manner recognizing there may be real world delays for computing time, transmission, etc., e.g., +/−1 second). In other examples, this transmission may be periodic (e.g., every five seconds, every ten seconds) or aperiodic (e.g., based on factor(s) such as an amount of data collected, memory storage capacity usage, user input(s), etc.).

In the example of FIG. 1, the image data 208 generated by the image sensor(s) 108 is stored in a database 210. In some examples, the occupancy tracking circuitry 110 includes the database 210. In other examples, the database 210 is located external to the occupancy tracking circuitry 110 in a location accessible to the occupancy tracking circuitry 110 as shown in FIG. 2.

The image processing circuitry 200 processes the image data 208 received from the image sensor(s) 108. For example, the image processing circuitry 200 can filter (e.g., downsample) the image data 208. In some examples, the image processing circuitry 200 time-synchronizes images (e.g., video streams) generated by two or more of the image sensors 108. In some examples, the image processing circuitry 200 analyzes image data from two or more of the image sensors 108 to determine if the images sensors 108 captured overlapping portions of the environment (e.g., the cabin 102). For instance, two of the image sensors 108 may capture the environment from different viewpoints and at least a portion of the environment be in overlapping fields of view of the image sensors 108. In such examples, the image processing circuitry 200 can remove (e.g., subtract) the overlapping portion of the environment from the images (e.g., frames) generated by one of the image sensors 108 to prevent subject(s) 106 captured in the image data 208 from both image sensors 108 from being counted more than once for purposes of determining occupancy metrics.

The facial recognition circuitry 201 of the example occupancy tracking circuitry 110 analyzes the processed image data 208 to recognize the presence of face(s) (i.e., human face(s)) in the image data 208 generated by the respective image sensor(s) 108. For instance, the facial recognition circuitry 201 analyzes each image (e.g., video frame, still image) of the image data 208 from the respective image sensors 108 to detect (e.g., predict) if any face(s) are in the image.

In the example of FIG. 2, the facial recognition circuitry 201 executes one or more facial recognition model(s) 212 to identify face(s) and associated facial features in the respective images (e.g., frames) of the image data 208. The facial recognition model(s) 212 can include machine-learning model(s) or algorithms that are trained to, for example, recognize an outline or contours corresponding to a human face in the image data 208 and identify one or more facial features (e.g., landmarks, keypoints) such as eyes, nose, lips, eyebrows, ears, etc. for the detected face.

In the example of FIG. 2, the facial recognition model(s) 212 are trained by facial recognition training circuitry 214 using training data 216. The facial recognition training circuitry 214 is implemented by processor circuitry of one or more user devices (e.g., the user device(s) 112 of FIG. 1, such as a smartphone, a personal computing device such as an electronic tablet or laptop) and/or the one or more cloud-based device(s) (e.g., the cloud 114 of FIG. 1). In some examples, the occupancy tracking circuitry 110 includes the facial recognition training circuitry 214.

The training data 216 includes images of human faces with labels identifying outlines of human face(s), locations and/or outlines of facial features such as eyes, eyebrows, lips, a nose, etc. In some examples, the training data 216 includes the image data 208 generated by the image sensor(s) 108 over time. The training data 216 can be stored in a database 218. In some examples, the databases 210, 218 are the same database.

The facial recognition training circuitry 214 trains a neural network using the training data 216 to recognize the presence of faces in image data and to identify facial feature(s) and/or combination(s) of facial features that define a human face in an image. The facial recognition model(s) 212 are generated as a result of the neural network training. The facial recognition model(s) 212 are stored in the database 210.

The example facial recognition circuitry 201 of FIG. 2 executes the facial recognition model(s) 212 for each image (e.g., frame) of the image data 208 to detect (e.g., predict) the presence of human face(s) in the images(s) and to define corresponding facial unit(s) based on identification of facial feature(s) for the detected face(s). Based on the neural network analysis, the facial recognition circuitry 201 labels the facial feature(s) for each face identified in the image data 208 with markers identifying components such as eyes, pupils, eyebrows, nose, lips, ears, hair, etc. For instance, the facial recognition circuitry 201 can mark or label the image data with an outline corresponding to an eye. The facial recognition circuitry 201 defines a facial unit based on the marked or labeled facial features. Each facial unit generated by the facial recognition circuitry 201 represents a face detected in the image data. For example, a facial unit can be defined based on a combination of (a) markers outlining facial contours of the face and (b) markers labeling eyes, lips, a nose, etc. within the outline defining the facial contours.

The facial recognition circuitry 201 stores each facial unit identified from the image data in the database 210 as a detected facial unit 220. For example, each facial unit 220 can be stored as image data including at least a portion of a face with the associated facial features markers. In some examples, the detected facial unit(s) 220 are used as the training data 216 to refine the facial recognition model(s) 212.

The facial recognition circuitry 201 can track the detected facial unit(s) 220 during movement of the corresponding subject(s) 106 between, for example, frames generated by the image sensor(s) 108. For instance, the facial recognition circuitry 201 can generate facial unit(s) as the subject(s) 106 of FIG. 1 are entering the cabin 102 of the rotorcraft 104 based on face(s) detected in the frame(s) of a video stream from one of the image sensors 108. The facial recognition circuitry 201 can track the facial unit(s) as the subject(s) 106 move into the cabin 102 in subsequent frames of the video stream by identifying the facial features in each frame and, in some examples, adjusting the locations of the markers defining the facial unit(s) in response to movement by the subject(s) 106.

In some examples of FIG. 2, a calibration process is performed in which certain ones of the detected facial unit(s) 220 are classified as associated with known or pre-identified subjects. For example, image data of known subject(s) such as the crew of the rotorcraft 104 of FIG. 1 can be provided to the facial recognition circuitry 201. The facial recognition circuitry 201 defines facial unit(s) representing the respective faces of the known subject(s) based on the calibration image data (e.g., by detecting the face(s), marking the facial feature(s), etc.). The facial unit(s) generated during the calibration process and corresponding to the known subject(s) are stored as known facial unit(s) 222 in the database 210. The calibration process can be performed in response to an event such as when a crew is assigned to the rotorcraft 104.

The facial unit classifying circuitry 202 of the example occupancy tracking circuitry 110 of FIG. 2 analyzes the detected facial unit(s) 220 in each image (e.g., frame) of the image data 208 generated by the respective image sensors 108. The facial unit classifying circuitry 202 classifies the facial unit(s) 220 as corresponding to known or pre-identified subjects (e.g., crew of the rotorcraft 104) or unknown or non-pre-identified subject(s) (e.g., individuals in the rotorcraft 104 other than the known crew and who have not been captured and recognized in previously analyzed image data).

The facial unit classifying circuitry 202 compares the detected facial unit(s) 220 in a particular image with the known facial unit(s) 222 to determine (e.g., predict) if any of the detected facial unit(s) 220 represent known individuals in the environment, such as personnel assigned to the rotorcraft 104. For example, for each detected facial unit 220 in an image of the image data 208, the facial unit classifying circuitry 202 compares the facial feature(s) in the image data correspondent to the detected facial unit 220 to the facial feature(s) in the image data corresponding to the known facial unit(s) 222. Based on the comparison, the facial unit classifying circuitry 202 determines (e.g., predicts) whether the facial feature(s) of detected facial unit 220 match or substantially match facial feature(s) for a known facial unit 222.

If the facial unit classifying circuitry 202 determines (e.g., predicts) that a detected facial unit 220 in an image of the image data 208 corresponds to one of the known facial units 222 stored in the database 210, the facial unit classifying circuitry 202 classifies the detected facial unit 220 as a known or pre-identified facial unit (i.e., associated with a face of a known subject).

If the facial unit classifying circuitry 202 determines that a detected facial unit 220 does not correspond to one of the known facial units 222, the facial unit classifying circuitry 202 determines if the detected facial unit 220 is associated with an individual who has been previously captured in the image data 208 generated by the image sensor(s) 108 and recognized by the facial recognition circuitry 201 other than the individuals represented by the known facial unit(s) 222. As disclosed herein, the facial unit classifying circuitry 202 stores processed facial unit(s) 224, or facial unit(s) 224 that have been previously classified by the facial unit classifying circuitry 202 as unknown or non-pre-identified facial units (i.e., not crew members), in the database 210. The known facial units 222 and processed facial units 224 define facial unit reference data 225. In some examples, the facial unit reference data 225 is used as the training data 216 to refine the facial recognition model(s) 212.

For example, if the facial unit classifying circuitry 202 determines that the detected facial unit 220 in a frame of the image data 208 does not correspond to one of the known facial unit(s) 222, the facial unit classifying circuitry 202 determines if the detected facial unit corresponds to a previously generated facial unit using the processed facial unit(s) 224. The processed facial unit(s) 224 can include facial units generated from image data received from any of the image sensor(s) 108 in the environment for a particular time period and/or associated with a particular event (e.g., boarding of the rotorcraft 104). The facial unit classifying circuitry 202 compares the facial feature(s) in the image data associated with a detected facial unit 220 to the facial feature(s) in the image data of the facial unit(s) stored as the processed facial unit(s) 224. Based on the comparison, the facial unit classifying circuitry 202 determines (e.g., predicts) whether the facial feature(s) of the detected facial unit 220 match or substantially match facial feature(s) for previously classified facial unit(s) 224.

If the facial unit classifying circuitry 202 does not associate the detected facial unit with the reference data 225, namely, one of the known facial unit(s) 222 or one of the processed facial unit(s) 224, the facial unit classifying circuitry 202 classifies the facial unit as an unknown or non-pre-identified facial unit. The facial unit classifying circuitry 202 also saves the unknown facial unit as a (new) processed facial unit 224 for use when analyzing subsequently generated image data by the image sensor 108 from which the image was generated or other image sensor(s) 108 in the environment.

As an example, as disclosed herein, a calibration process can be performed in which faces of the crew members or personnel of the rotorcraft 104 of FIG. 1 are captured in image data and saved as the known facial unit(s) 222. If the facial unit classifying circuitry 202 determines that the facial feature(s) of a detected facial unit 220 in an image (e.g., frame) of the image data 208 match or substantially match the facial feature(s) of one of the crew members represented by the known facial unit(s) 222, then the facial unit classifying circuitry 202 classifies the detected facial unit 220 as a known facial unit.

As another example, if the facial unit classifying circuitry 202 determines (e.g., predicts) that a detected facial unit 220 corresponds to one of the processed facial unit(s) 224 (e.g., based on facial feature analysis), the facial unit classifying circuitry 202 determines that the subject associated with the identified facial unit 220 was previously captured in the image data 208. In such instances, the facial unit classifying circuitry 202 classifies the detected facial unit 220 as a recognized facial unit. For instance, the facial unit 220 can represent a subject who is captured by one of the image sensors 108 in image data over time. The facial unit classifying circuitry 202 can use the processed facial unit(s) 224 to track the subject between images (e.g., frames) of the image data 208 generated by the image sensor 108.

The facial unit classifying circuitry 202 can also use the processed facial unit(s) 224 to track subjects in image data generated by two or more of the image sensors 108. For example, a subject who is captured in different fields of view of two or more image sensor(s) 108 due to the subject moving in the environment is prevented or substantially prevented from being classified as unknown facial units in each frame of the image data 208 generated by the respective image sensors 108. Instead, the facial unit classifying circuitry 202 uses the processed facial unit(s) 224 to determine if the detected facial unit(s) 220 have been previously captured in the image data 208 generated by any one of the image sensors 108.

As another example, the facial unit classifying circuitry 202 can use the processed facial unit(s) 224 to compare the facial unit(s) 220 detected in two or more time-synchronized images (e.g., frames) of the image data 208 from different image sensors 108. For example, the facial unit classifying circuitry 202 can classify a detected facial unit 220 in a frame of image data 208 generated by a first one of the image sensors 108 as an unknown facial unit. If the facial unit classifying circuitry 202 determines that the same facial unit is detected in a time-synchronized frame of image data 208 generated by a second one of the image sensors 108, the facial unit classifying circuitry 202 can classify the facial unit in the image data from the second image sensor 108 as a recognized facial unit to prevent the facial unit from being counted as an unknown facial unit more than once.

Thus, the facial unit classifying circuitry 202 assigns classifications to the detected facial unit(s) 220 based on the facial feature analysis. As a result of the analysis, the facial unit classifying circuitry 202 classifies each detected facial unit 220 in an image of the image data 208 as (a) a known facial unit (i.e., based on the known facial unit(s) 222 in the database 210); (b) a recognized facial unit (i.e., based on the previously analyzed processed facial unit(s) 224); or (c) an unknown facial unit.

The augmented reality (AR) tagging circuitry 204 of the example occupancy tracking circuitry 110 of FIG. 2 uses the classifications assigned to each detected facial unit 220 (e.g., known, recognized, unknown) to generate augmented reality-based virtual graphical indicator(s), marker(s), or object(s) 226 that represent the facial unit(s). In the example of FIG. 2, the AR tagging circuitry 204 causes the virtual object 226 to overlay, align with, be positioned over, or appear to cover at least a portion of each detected facial unit 220 in an image of the image data 208 (e.g., a video frame). The virtual objects 226 generated by the augmented reality tagging circuitry 204 can include, for example, three-dimensional (3D) geometrical shapes such as spheres, rectangles, triangles, and/or other shapes and/or designs. The AR tagging circuitry 204 generates the virtual objects 226 based on AR tagging rule(s) 227 stored in the database 210. The AR tagging rule(s) 227 are defined based on user input(s).

In the example of FIG. 2, the AR tagging circuitry 204 causes a virtual marker or object 226 having a first format (e.g., a first color, size, shape, etc.) to overlay at least a portion of the corresponding detected facial unit(s) 220 in the image that are classified by the facial unit classifying circuitry 202 as known facial unit(s) (e.g., facial units associated with the crew of the rotorcraft 104). The AR tagging circuitry 204 causes a virtual marker or object 226 having a second format (e.g., a second color, size, shape, etc. different from the first format) to overlay the facial unit(s) in the image classified by the facial unit classifying circuitry 202 as unknown facial unit(s). For example, the AR tagging circuitry 204 can cause a green sphere (a first virtual object 226) to overlay facial unit(s) in a frame of the image data 208 that are classified as known facial unit(s) and a purple sphere (a second virtual object) to overlay facial unit(s) in a frame of the image data 208 that are classified as unknown facial unit(s).

In some examples, the detected facial unit 220 is classified as an unknown facial unit in a first frame of the image data 208 from one of the image sensors 108 and as a recognized facial unit in a second frame of the image data 208 from that same image sensor 108. In such examples, the AR tagging circuitry 204 can cause the virtual object having the second format to be displayed for (e.g., overlay) the facial unit in the first frame and the second frame to track the unknown facial unit between subsequent frames of the image data generated by the same image sensor 108 and based on the AR tagging rule(s) 227.

In some examples, the detected facial unit 220 is classified as an unknown facial unit in a first image of image data 208 from a first one of image sensors 108 and as a recognized facial unit in a second image of the image data 208 from a second, different image sensor 108. In such examples, based on the AR tagging rule(s) 227, the AR tagging circuitry 204 can cause the virtual object having the second format to be displayed for the facial unit in the first image, but refrain from generating a virtual object 226 for the facial unit in the second image to prevent the subject from being represented by a virtual object 226 indicating an unknown facial unit more than once.

The AR tagging circuitry 204 can cause the image (e.g., video frame) including the respective virtual objects 226 to be displayed via, for instance, a display screen 228 of a user device 230 (e.g., the user device 112 of FIG. 1). In some examples, the AR tagging circuitry 204 causes the images of the subject(s) 106 and the portion of the environment (e.g., the cabin 102) to be removed such that only the virtual object(s) 226 representing the facial unit(s) detected in an image are output for presentation via the display screen 228 of the user device 230.

In examples in which the image processing circuitry 200 time-synchronizes images (e.g., frames) of the image data 208 from two or more image sensors 108, the AR tagging circuitry 204 generates the virtual objects 226 for each time-synchronized image based on the classified facial units detected in a respective image and the AR tagging rule(s) 227 (e.g., rules defining treatment of the recognized facial units between image data from different image sensors 108). In some examples, the AR tagging circuitry 204 causes each time-synchronized image from each image sensor 108 to be presented with the virtual objects 226 generated for that image via the display screen 228. In some examples, the AR tagging circuitry 204 counts the number of virtual objects 226 associated with known facial units and the be displayed via the display screen 228 of the user device 230. For example, if number of virtual objects 226 associated with unknown facial units in each time-synchronized image, sums the total number of virtual objects 226 associated with known facial units and the number of virtual objects 226 associated with unknown facial units across the images, and causes virtual objects corresponding to the total number of virtual objects 226 associated with known facial units and virtual objects corresponding to the total number of virtual objects 226 associated with unknown facial units to a frame of the image data 208 associated with a first image sensor 108 includes four unknown facial units and a time-synchronized frame of the image data associated with a second image sensor 108 includes three unknown facial units and one known facial unit, the augmented reality tagging circuitry 204 can cause seven virtual objects 226 representing the unknown facial units and one virtual object 226 representing the known facial unit to be presented via the display screen 228.

The metric calculating circuitry 206 of the example occupancy tracking circuitry 110 of FIG. 1 calculates metrics 232 such as an occupancy of the rotorcraft 104 at a given time based on the virtual objects 226 assigned to the image(s) of the image data 208. In examples in which the AR tagging circuitry 204 generates virtual objects 226 for two or more time-synchronized images, the metric calculating circuitry 206 counts the total number of virtual objects 226 representing unknown facial units in the images and the total number of virtual objects 226 representing known facial units in the images to determine the occupancy metrics 232.

The metric calculating circuitry 206 calculates a total number of individual(s) or subject(s) 106 in the cabin 102 at a given time (e.g., total attendance) based on the total number of virtual objects 226 representing unknown facial units and the total number of virtual objects 226 representing known facial units in an image or, in some examples, two or more time-synchronized images. The metric calculating circuitry 206 determines a current occupancy percentage of the rotorcraft 104 at a given time by subtracting the total attendance from a total permissible occupancy value for the rotorcraft 104. The total permissible occupancy value can be user-defined and stored in the database 210 as occupancy rule(s) 234. In some examples, the metric calculating circuitry 206 updates the occupancy metrics 232 based on each image or set of time-synchronized images for which the AR tagging circuitry 204 generates the virtual objects 226 over time. In some examples, the metric calculating circuitry 206 maintains the occupancy metrics 232 if, for example, no additional virtual objects have been associated with subsequent images (e.g., frames) of the image data, thereby indicating that any facial units in the subsequent images are classified as known facial units or recognized facial units. Thus, the metric calculating circuitry 206 provides for real-time or substantially real-time (e.g., +/−1 second) tracking of occupancy of the rotorcraft 104 based on the image data analysis.

The metric calculating circuitry 206 can cause the occupancy metrics 232 to be displayed via the display screen 228 of the user device 230 for viewing by, for instance, the crew of the rotorcraft 104. For example, based on the virtual objects 226 representing the known facial units, the metric calculating circuitry 206 can output a metric including a number of crew on the rotorcraft 104 for display. Based on the virtual objects 226 representing the unknown facial units, the metric calculating circuitry 206 can output a metric including a number of external passengers (i.e., non-crew individuals) on the rotorcraft 104 for display. The metric calculating circuitry 206 can cause the total attendance and the occupancy percentage to be output for display. The metric calculating circuitry 206 can cause the display of the metrics 232 to be updated based on changes in the calculation of the metrics over time.

In some examples, the occupancy tracking circuitry 110 includes means for image processing. For example, the means for image processing may be implemented by the image processing circuitry 200. In some examples, the image processing circuitry 200 may be instantiated by processor circuitry such as the example processor circuitry 712 of FIG. 7. For instance, the image processing circuitry 200 may be instantiated by the example general purpose processor circuitry 800 of FIG. 8 executing machine executable instructions such as that implemented by at least blocks 502, 508 of FIG. 5 and/or blocks 602, 604, 636 of FIG. 6. In some examples, the image processing circuitry 200 may be instantiated by hardware logic circuitry, which may be implemented by an ASIC or the FPGA circuitry 900 of FIG. 9 structured to perform operations corresponding to the machine readable instructions. Additionally or alternatively, the image processing circuitry 200 may be instantiated by any other combination of hardware, software, and/or firmware. For example, the image processing circuitry 200 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the occupancy tracking circuitry 110 includes means for facial recognition. For example, the means for facial recognition may be implemented by the facial recognition circuitry 201. In some examples, the facial recognition circuitry 201 may be instantiated by processor circuitry such as the example processor circuitry 712 of FIG. 7. For instance, the facial recognition circuitry 201 may be instantiated by the example general purpose processor circuitry 800 of FIG. 8 executing machine executable instructions such as that implemented by at least block 504 of FIG. 5 and/or blocks 606, 608, 610 of FIG. 6. In some examples, the facial recognition circuitry 201 may be instantiated by hardware logic circuitry, which may be implemented by an ASIC or the FPGA circuitry 900 of FIG. 9 structured to perform operations corresponding to the machine readable instructions. Additionally or alternatively, the facial recognition circuitry 201 may be instantiated by any other combination of hardware, software, and/or firmware. For example, the facial recognition circuitry 201 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the occupancy tracking circuitry 110 includes means for classifying facial units. For example, the means for classifying facial units may be implemented by the facial unit classifying circuitry 202. In some examples, the facial unit classifying circuitry 202 may be instantiated by processor circuitry such as the example processor circuitry 712 of FIG. 7. For instance, the facial unit classifying circuitry 202 may be instantiated by the example general purpose processor circuitry 800 of FIG. 8 executing machine executable instructions such as that implemented by at least block 506 of FIG. 5 and/or blocks 612, 614, 618, 622, 626 of FIG. 6. In some examples, the facial unit classifying circuitry 202 may be instantiated by hardware logic circuitry, which may be implemented by an ASIC or the FPGA circuitry 900 of FIG. 9 structured to perform operations corresponding to the machine readable instructions. Additionally or alternatively, the facial unit classifying circuitry 202 may be instantiated by any other combination of hardware, software, and/or firmware. For example, the facial unit classifying circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the occupancy tracking circuitry 110 includes means for tagging. For example, the means for tagging may be implemented by the augmented reality (AR) tagging circuitry 204. In some examples, the AR tagging circuitry 204 may be instantiated by processor circuitry such as the example processor circuitry 712 of FIG. 7. For instance, the AR tagging circuitry 204 may be instantiated by the example general purpose processor circuitry 800 of FIG. 8 executing machine executable instructions such as that implemented by at least blocks 616, 620, 624, 630 of FIG. 6. In some examples, the AR tagging circuitry 204 may be instantiated by hardware logic circuitry, which may be implemented by an ASIC or the FPGA circuitry 900 of FIG. 9 structured to perform operations corresponding to the machine readable instructions. Additionally or alternatively, the AR tagging circuitry 204 may be instantiated by any other combination of hardware, software, and/or firmware. For example, the AR tagging circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the occupancy tracking circuitry 110 includes means for calculating metrics. For example, the means for calculating metrics may be implemented by the metric calculating circuitry 206. In some examples, the metric calculating circuitry 206 may be instantiated by processor circuitry such as the example processor circuitry 712 of FIG. 7. For instance, the metric calculating circuitry 206 may be instantiated by the example general purpose processor circuitry 800 of FIG. 8 executing machine executable instructions such as that implemented by at least blocks 628, 630 of FIG. 6. In some examples, the metric calculating circuitry 206 may be instantiated by hardware logic circuitry, which may be implemented by an ASIC or the FPGA circuitry 900 of FIG. 9 structured to perform operations corresponding to the machine readable instructions. Additionally or alternatively, the metric calculating circuitry 206 may be instantiated by any other combination of hardware, software, and/or firmware. For example, the metric calculating circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the occupancy tracking circuitry of FIG. 110 is illustrated in FIG. 2, one or more of the elements, processes, and/or devices illustrated in FIG. 2 may be combined, divided, re-arranged, omitted, eliminated, and/or implemented in any other way. Further, the example image processing circuitry 200, the example facial recognition circuitry 201, the example facial unit classifying circuitry 202, the example augmented reality tagging circuitry 204, the example metric calculating circuitry 206, the example database 210, and/or, more generally, the example occupancy tracking circuitry 110 of FIG. 1, may be implemented by hardware alone or by hardware in combination with software and/or firmware. Thus, for example, any of the example image processing circuitry 200, the example facial recognition circuitry 201, the example facial unit classifying circuitry 202, the example augmented reality tagging circuitry 204, the example metric calculating circuitry 206, the example database 210 and/or, more generally, the example occupancy tracking circuitry 110, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example occupancy tracking circuitry 110 of FIG. 1 may include one or more elements, processes, and/or devices in addition to, or instead of, those illustrated in FIG. 2, and/or may include more than one of any or all of the illustrated elements, processes, and devices.

While an example manner of implementing the facial recognition training circuitry 214 is illustrated in FIG. 2, one or more of the elements, processes, and/or devices illustrated in FIG. 2 may be combined, divided, re-arranged, omitted, eliminated, and/or implemented in any other way. Further, the facial recognition training circuitry 214 of FIG. 2 may be implemented by hardware alone or by hardware in combination with software and/or firmware. Thus, for example, the facial recognition training circuitry 214 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example facial recognition training circuitry 214 may include one or more elements, processes, and/or devices in addition to, or instead of, those illustrated in FIG. 2, and/or may include more than one of any or all of the illustrated elements, processes, and devices.

Figure 3:
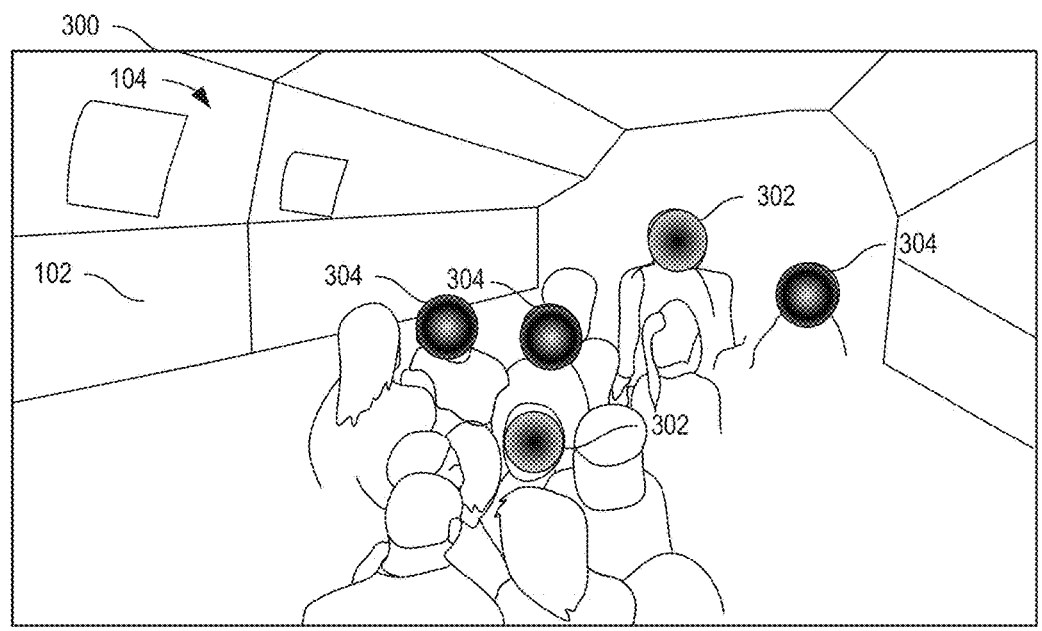
FIG. 3 illustrates an image including augmented reality markers to identify subjects in an environment in accordance with teachings of this disclosure.

FIG. 3 illustrates an example image or video frame 300 generated by one of the image sensors 108 of FIG. 1 and including virtual objects (e.g., the virtual objects 226 of FIG. 2) generated by AR tagging circuitry 204 of the example occupancy tracking circuitry 110 of FIG. 2. The frame 300 of FIG. 3 captures a portion of the cabin 102 of the rotorcraft 104 of FIG. 1.

In the example of FIG. 3, the AR tagging circuitry 204 generates first virtual objects or markers 302 to represent facial units classified by the facial unit classifying circuitry 202 as known facial units (e.g., crew members of the rotorcraft 104). As illustrated in FIG. 3, the AR tagging circuitry 204 causes the first virtual objects 302 to overlay (e.g., appear to cover, be aligned with, positioned over, etc.) at least a portion of the corresponding facial units classified as known facial units in the frame 300.

The AR tagging circuitry 204 generates second virtual objects or markers 304 to represent the facial units classified by the facial unit classifying circuitry 202 as unknown facial units (e.g., facial units representing non-crew passengers and/or facial units that have not been detected in previously generated image data). In some examples, the example frame 300 including the virtual objects 302, 304 is output for display via the display screen 228 of the user device 230 of FIG. 2.

Figure 4:
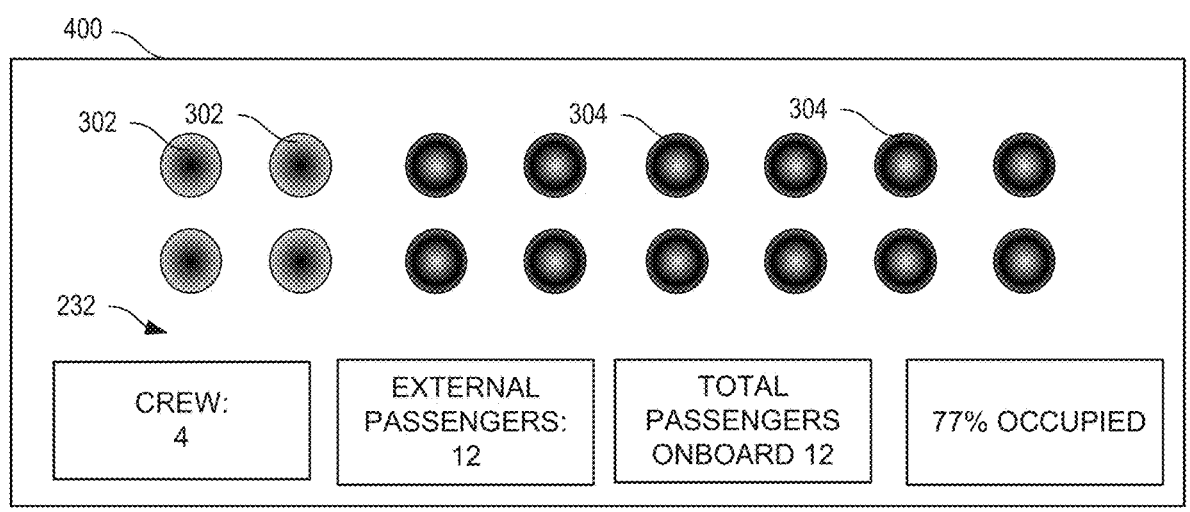
FIG. 4 illustrates an example graphical user interface including occupancy metrics for subjects in an environment in accordance with teachings of this disclosure.

FIG. 4 illustrates an example graphical user interface 400 for displaying occupancy metrics determined by the metric calculating circuitry 206 of FIG. 2. The user interface 400 of FIG. 4 may be displayed via, for example, the display screen 228 of the user device 230 (e.g., a smartphone, a display screen of a computer of the rotorcraft 104, etc.).

The example user interface 400 includes the virtual objects 302, 304 of FIG. 3 representing known and unknown facial units generated by the AR tagging circuitry 204 based on the frame 300 of FIG. 3 and one or more other frames generated by the image sensor(s) 108 that capture the cabin 102 of FIG. 1 and are time-synchronized with the frame 300 of FIG. 3. As shown in FIG. 4, the user interface 400 presents a total number of virtual objects 302 representing known facial units in the image frames (e.g., four) and a total number of virtual objects 304 representing unknown facial units in the image frames (e.g., twelve). The example user interface 400 of FIG. 4 includes the occupancy metrics 232 calculated by the metric calculating circuitry 206 including, for example, a total number of crew on the rotorcraft 104, a total number of external passengers on the rotorcraft 104, a total number of passengers on the rotorcraft 104, and an occupancy percentage of the rotorcraft 104 at a given time based on the virtual objects 302, 304 generated by the augmented reality tagging circuitry 204.

Figure 5:
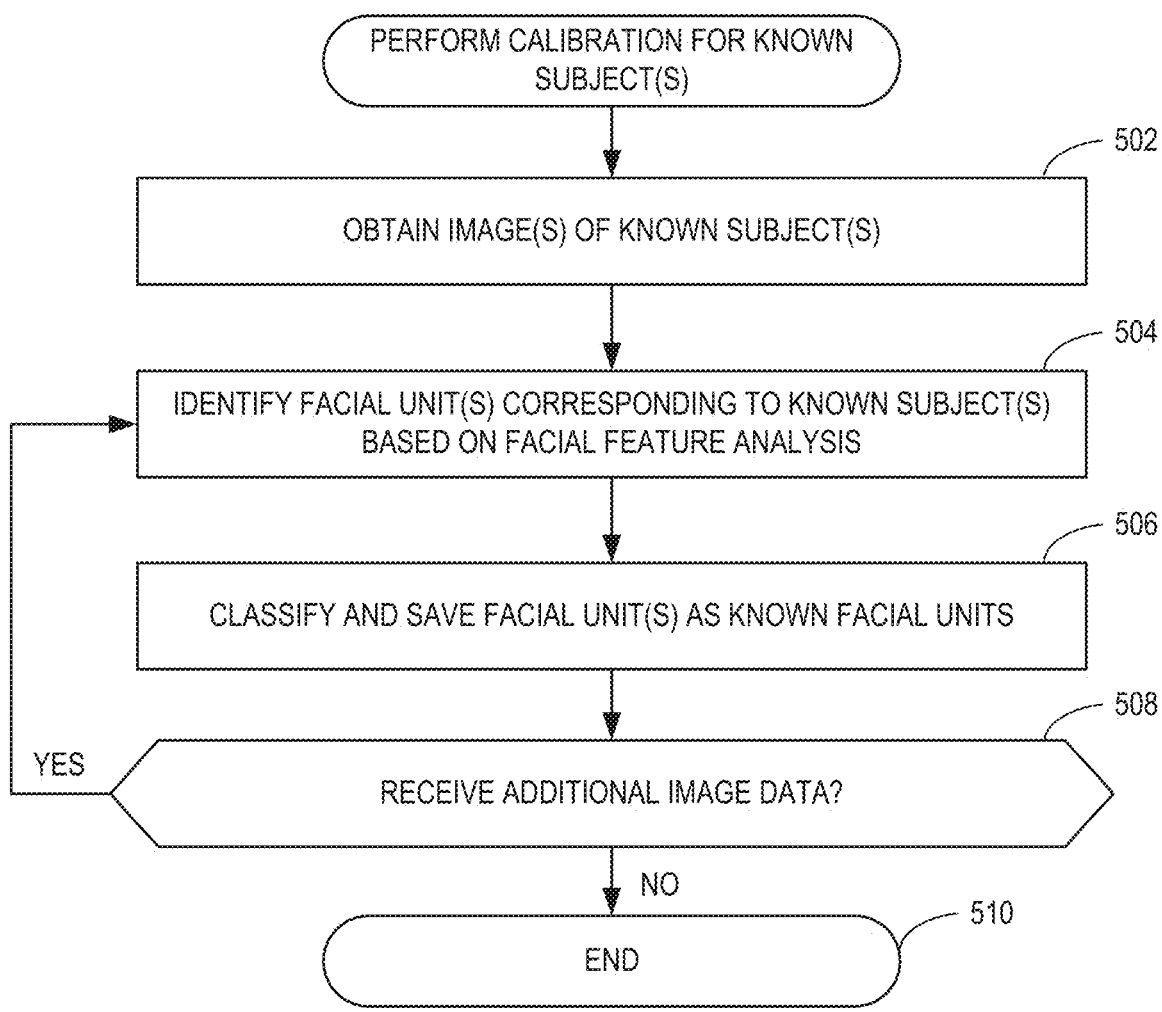
FIG. 5 is a flowchart representative of example machine readable instructions and/or example operations that may be executed by example processor circuitry to implement the occupancy tracking circuitry of FIG. 2.
Figure 6:
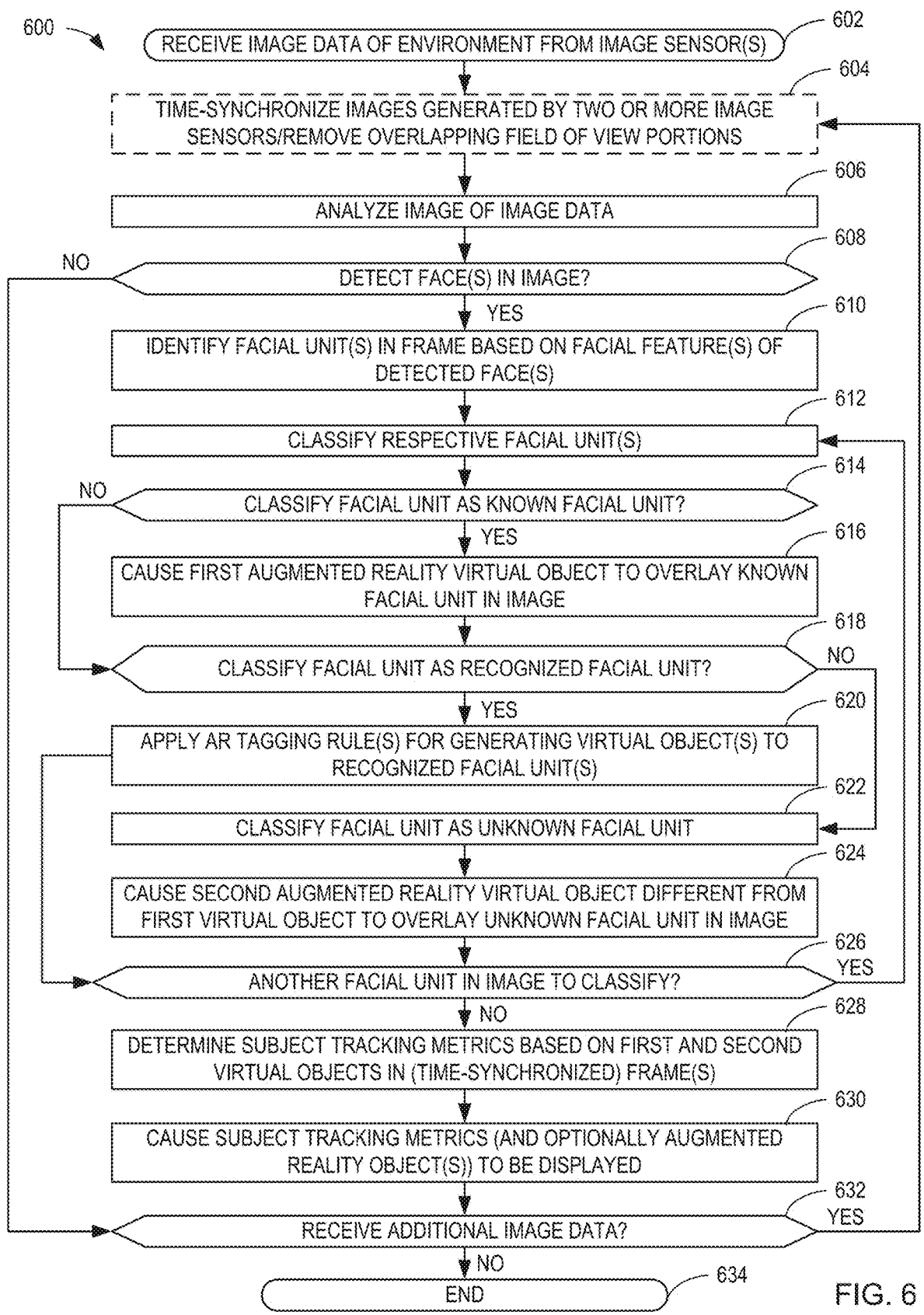
FIG. 6 is another flowchart representative of example machine readable instructions and/or example operations that may be executed by example processor circuitry to implement the occupancy tracking circuitry of FIG. 2

Flowcharts representative of example hardware logic circuitry, machine readable instructions, hardware implemented state machines, and/or any combination thereof for implementing the occupancy tracking circuitry 110 of FIG. 2 are shown in FIGS. 5 and 6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 5 and/or 6, many other methods of implementing the example occupancy tracking circuitry 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5 and 6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions and/or example operations 500 that may be executed and/or instantiated by processor circuitry to perform a calibration process to identify facial units associated with known subjects in an environment, such as crew members of the rotorcraft 104 of FIG. 1. The machine readable instructions and/or the operations 500 of FIG. 5 begin at block 502, at which the image processing circuitry 200 of the example occupancy tracking circuitry 110 of FIG. 2 obtains image(s) of the known subject(s). The image(s) of the known subject(s) can be generated by the image sensor(s) 108 of FIG. 1 and/or include image(s) of the known subject(s) generated by other image sensor(s).

At block 504, the facial recognition circuitry 201 analyzes the image(s) to detect the face(s) corresponding to the known subject(s) in the images and label corresponding facial feature(s). The facial recognition circuitry 201 defines the facial unit(s) for the known subject(s) based on, for examples, the detected facial features.

At block 506, the facial unit classifying circuitry 202 classifies the facial unit(s) associated with the known subject(s) as the known facial unit(s) 222. The known facial unit(s) 222 are stored in the database 210 for access by the occupancy tracking circuitry 110. The example instructions 500 of FIG. 5 end when there are no further known subject(s) to identify as part of the calibration process (blocks 508, 510).

FIG. 6 is a flowchart representative of example machine readable instructions and/or example operations 600 that may be executed and/or instantiated by processor circuitry to determine metrics such as occupancy in an environment such as the cabin 102 of the rotorcraft 104 of FIG. 1 using augmented reality. The machine readable instructions and/or the operations 600 of FIG. 6 begin at block 602, at which the image processing circuitry 200 receives the image data 208 of at least a portion of the environment from the image sensor(s) 108 of FIG. 1.

In some examples, at block 604, the image processing circuitry 200 performs pre-analysis processing of the image data 208. For example, the image processing circuitry 200 can time-synchronize images (e.g., frames) from the image data 208 generated by two or more of the image sensors 108. In some examples, the image processing circuitry 200 removes portions of the environment captured in overlapping fields of view of two or more of the image sensors from the image data generated by at least one of the image sensors 108 with the overlapping fields of view.

At block 606, the facial recognition circuitry 201 analyzes the images(s) of the image data to determine if any face(s)

are detected in the respective images. For example, the facial recognition circuitry 201 can predict the presence of faces based on detection of contours or outlines corresponding to a face.

If, at block 608, the facial recognition circuitry 201 detect(s) face(s) in an image of the image data 208, the facial recognition circuitry 201 identifies facial unit(s) in the image based on facial feature(s) of the detected face(s) at block 610. For example, the facial recognition circuitry 201 executes the facial recognition model(s) 212 to identify the facial features in the detected faces. The facial recognition circuitry 201 defines the corresponding facial unit(s) based on combinations of the facial features. The facial recognition circuitry 201 stores the facial unit(s) as the detected facial unit(s) 220.

At block 612, the facial unit classifying circuitry 202 classifies the identified facial unit(s) 220 as known facial unit(s), previously recognized facial unit(s), or unknown facial unit(s). For example, the facial unit classifying circuitry 202 compares the detected facial unit(s) 220 (e.g., facial features in the facial units) to the known facial unit(s) 222 (as generated using the example instructions 500 of FIG. 5) and the processed facial unit(s) 224 to determine if the respective identified facial unit(s) in an image represent known subject(s) (e.g., crew members) or have been previously captured in the image data 208.

If, at block 614, the facial unit classifying circuitry 202 classifies an identified facial unit 220 in an image as a known facial unit (e.g., a crew member), then the AR tagging circuitry 204 causes a first virtual object or marker 226, 302 to overlay, align with, be positioned over, or appear to cover at least a portion of the known facial unit in the image at block 616.

If, at block 618, the facial unit classifying circuitry 202 classifies the facial unit as a recognized facial unit, or a previously identified facial unit based on the processed facial unit(s) 224 (and different from a known facial unit), then at block 620 the AR tagging circuitry 204 executes the AR tagging rule(s 227 to determine whether or not to generate a virtual object for the facial unit to prevent, for instance, the subject from being represented by a virtual object 226, 304 indicating an unknown facial unit more than once.

If, based on the comparison to the reference data 225 (i.e., the known facial unit(s) 222 and/or the processed facial unit(s) 224) the facial unit classifying circuitry 202 does not classify the facial unit as a known facial unit or as recognized facial unit, then at block 622, the facial unit classifying circuitry 202 classifies the facial unit as an unknown facial unit. At block 624, the AR tagging circuitry 204 causes a second virtual object or maker 226, 304 different from the first virtual object 226, 302 (e.g., having a different color) to overlay at least a portion of the unknown facial unit in the image. The instructions of FIG. 6 continue to classify the facial unit(s) in the image until there are no further facial units to classify (block 626).

At block 628, the metric calculating circuitry 206 determines occupancy tracking metrics 232 such as an occupancy of the cabin 102 of the rotorcraft 104 based on the virtual objects in the image or two or more time-synchronized images. For example, the metric calculating circuitry 206 calculates the total attendance of the rotorcraft 104 at a given time based on the total number of virtual objects 226 associated with unknown facial units and the total number of virtual objects 226 associated with known facial units for two or more time-synchronized images. The metric calculating circuitry 206 determines a current occupancy percentage of the rotorcraft 104 at a given time by subtracting the total attendance occupancy from a total permissible occupancy value for the rotorcraft 104.

At block 630, the metric calculating circuitry 206 outputs the occupancy metrics 232 for presentation via a display screen of a device (e.g., the user device 112, 230). In some examples, the AR circuitry 204 causes the virtual objects to be output for display to provide a visual representation of the subject(s) detected in the image.

The example instructions 600 of FIG. 6 end when there is no further image data to analyze (blocks 632, 634).

Figure 7:
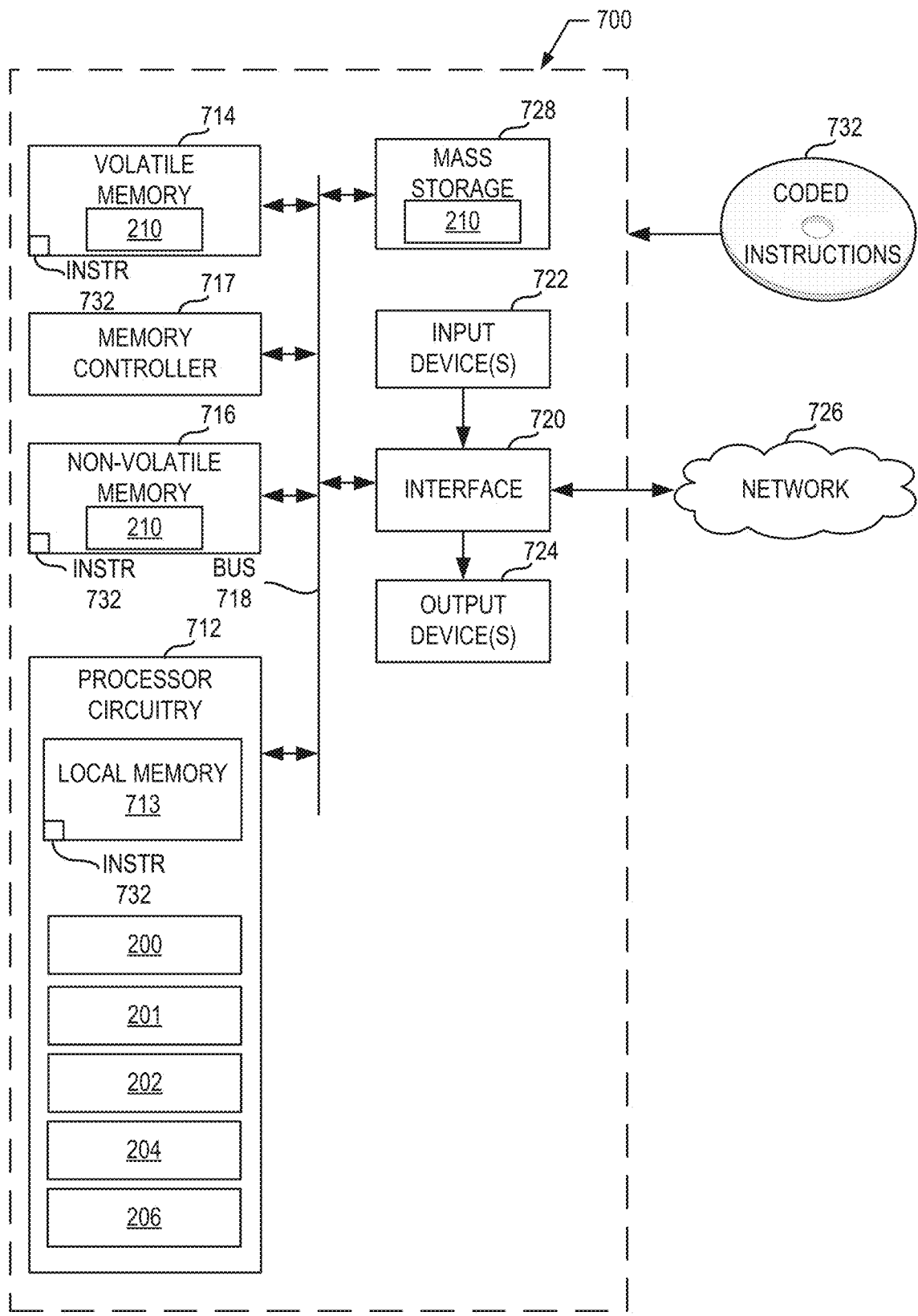
FIG. 7 is a block diagram of an example processing platform including processor circuitry structured to execute the example machine readable instructions and/or the example operations of FIGS. 5 and/or 6 to implement the occupancy tracking circuitry of FIG. 2.

FIG. 7 is a block diagram of an example processor platform 700 structured to execute and/or instantiate the machine readable instructions and/or the operations of FIGS. 5 and/or 6 to implement the occupancy tracking circuitry 110 of FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset (e.g., an augmented reality (AR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example image processing circuitry 200, the example facial recognition circuitry 201, the example facial unit classifying circuitry 202, the example augmented reality tagging circuitry 204, and the example metric calculating circuitry 206.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 732, which may be implemented by the machine readable instructions of FIGS. 5 and/or 6, may be stored in the mass storage device 728, in the volatile memory 714, in the non-volatile memory 716, and/or on a removable non-transitory computer readable storage medium such as a CD or DVD.

Figure 8:
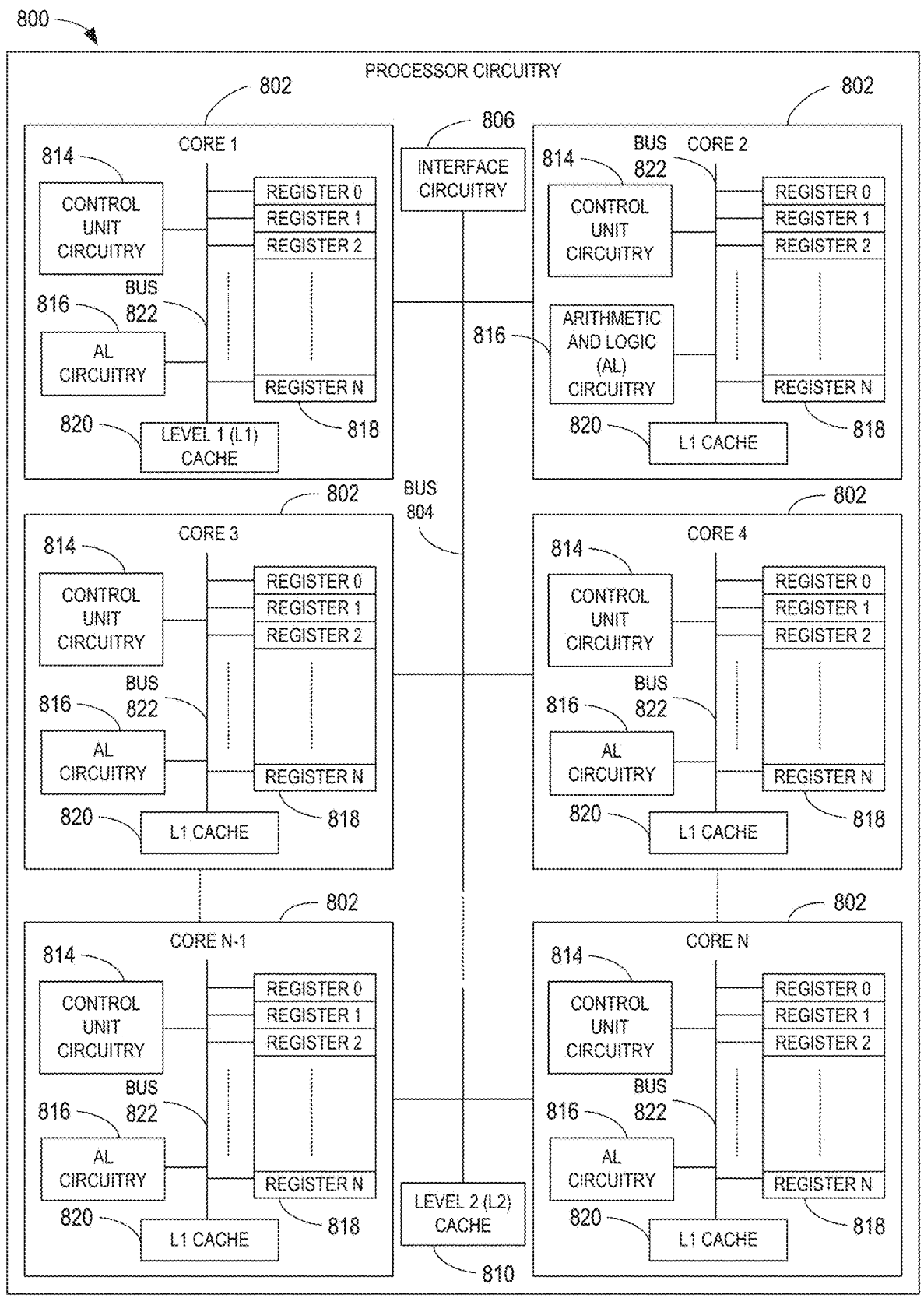
FIG. 8 is a block diagram of an example implementation of the processor circuitry of FIG. 5.

FIG. 8 is a block diagram of an example implementation of the processor circuitry 712 of FIG. 4. In this example, the processor circuitry 712 of FIG. 7 is implemented by a general purpose microprocessor 800. The general purpose microprocessor circuitry 800 executes some or all of the machine readable instructions of the flowchart of FIGS. 5 and/or 6 to effectively instantiate the circuitry of FIG. 2 as logic circuits to perform the operations corresponding to those machine readable instructions. In some such examples, the circuitry of FIG. 2 is instantiated by the hardware circuits of the microprocessor 800 in combination with the instructions. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. and/or 6.

The cores 802 may communicate by a first example bus 804. In some examples, the first bus 804 may implement a communication bus to effectuate communication associated with one(s) of the cores 802. For example, the first bus 804 may implement at least one of an Inter-Integrated Circuit (I2C) bus, a Serial Peripheral Interface (SPI) bus, a PCI bus, or a PCIe bus. Additionally or alternatively, the first bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_ cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
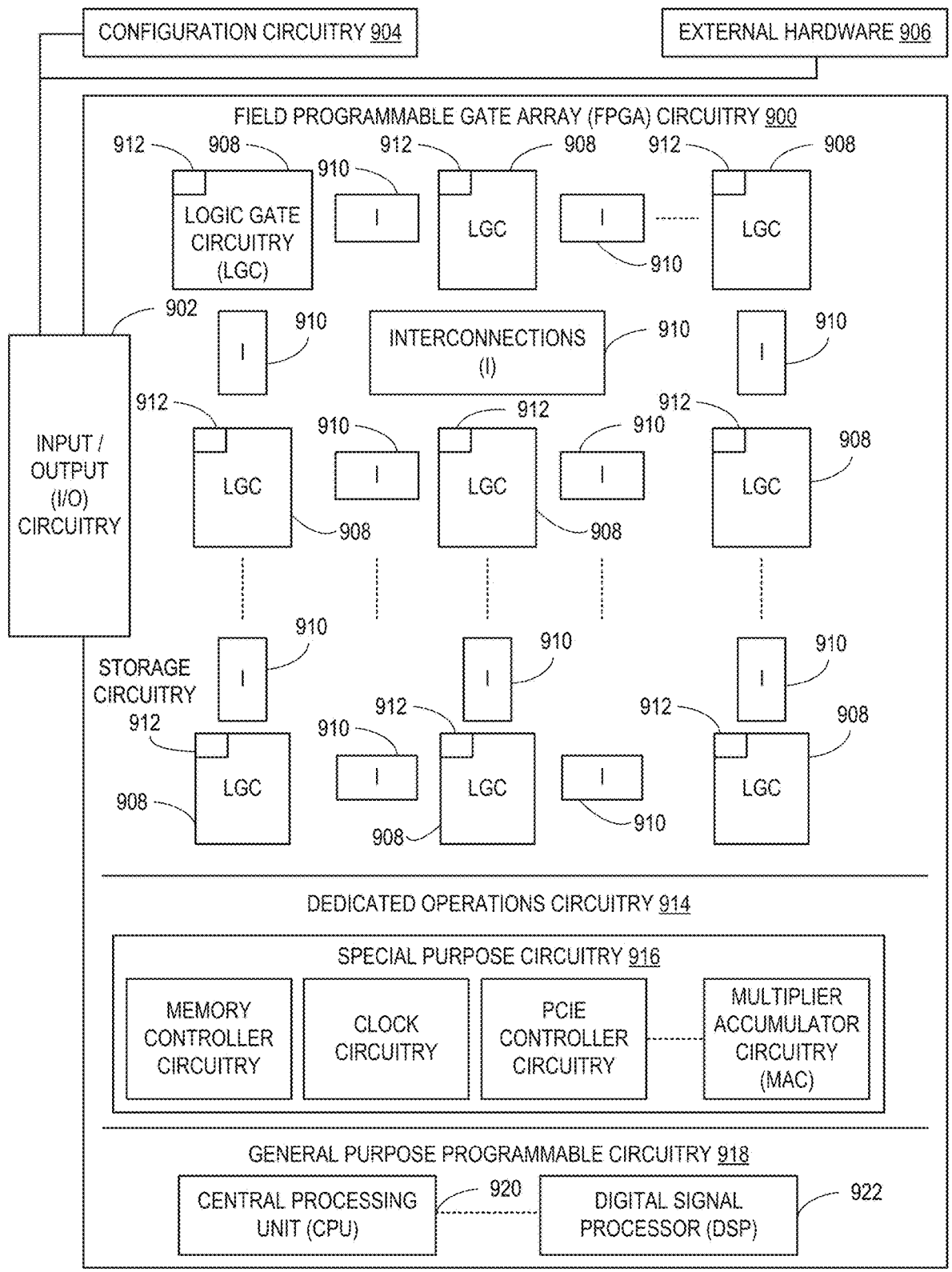
FIG. 9 is a block diagram of another example implementation of the processor circuitry of FIG. 5.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowchart of FIGS. 5 and/or 6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 5 and/or 6. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 5 and/or 6. As such, the FPGA circuitry 900 may be structured to effectively instantiate some or all of the machine readable instructions of the flowcharts of FIGS. 5 and/or 6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 5 and/or 6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIGS. 5 and/or 6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 5 and/or 6 may be executed by one or more of the cores 802 of FIG. 8, a second portion of the machine readable instructions represented by the flowcharts of FIGS. 5 and/or 6 may be executed by the FPGA circuitry 900 of FIG. 9, and/or a third portion of the machine readable instructions represented by the flowcharts of FIGS. 5 and/or 6 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 712 of FIG. 7 may be in one or more packages. For example, the processor circuitry 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
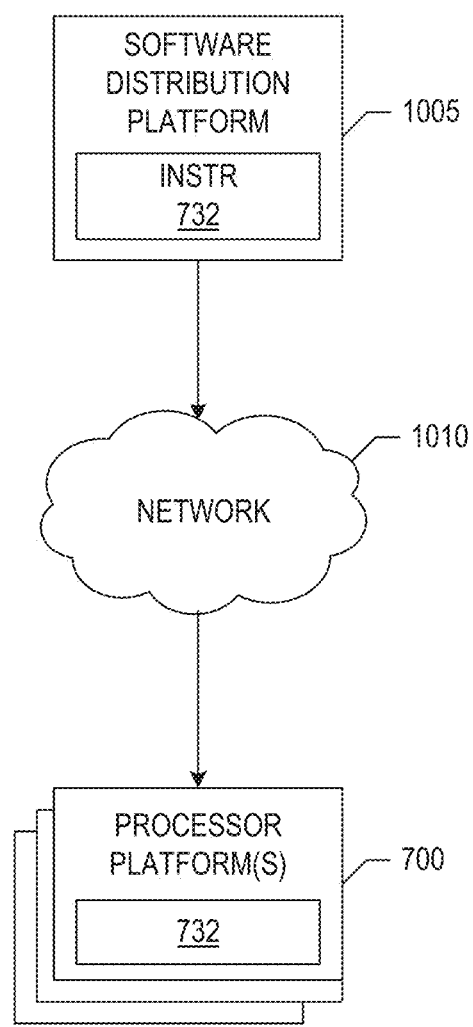
FIG. 10 is a block diagram of an example software distribution platform (e.g., one or more servers) to distribute software (e.g., software corresponding to the example machine readable instructions of FIGS. 5 and/or 6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions 500, 600 of FIGS. 5 and/or 6, as described above. The one or more servers of the example software distribution platform 1005 are in communication with a network 1010, which may correspond to any one or more of the Internet and/or any of the example networks 726 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions 500, 600 of FIGS. 5 and/or 6, may be downloaded to the example processor platform 700, which is to execute the machine readable instructions 732 to implement the occupancy tracking circuitry 110. In some example, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that provide for tracking of occupancy of an environment (e.g., a cabin of an air vehicle, a building) using facial recognition-based augmented reality. Examples disclosed herein perform facial recognition analysis to identify facial features defining faces in image data. Examples disclosed herein classify facial units defined by the facial features based on previously identified facial units and/or facial units corresponding to known subjects to distinguish between facial units associated with previously known or recognized subjects and facial units associated with unidentified or unknown subjects. Based on the classifications, example disclosed herein generate virtual objects (e.g., 3D objects) and overlay the virtual objects in the images using augmented reality. The virtual objects serve as proxies for the detected faces in the image data and can differentiate between the pre-identified and non-pre-identified facial units. As a result, the virtual objects provide for efficient identification of subjects to enable metrics such as occupancy to be accurately calculated.

Example systems, apparatus, and methods for occupancy tracking using augmented reality are disclosed herein. Further examples and combinations thereof include the following:

Example 1 includes an apparatus comprising memory; instructions; and processor circuitry to execute the instructions to detect a first face in image data, the image data generated by image sensors in an environment and including at least a portion of the environment, the first face corresponding to a subject in the environment; define a first facial unit in the image data based on facial features associated with the first face; associate a first virtual object with the first facial unit in the image data; and determine an occupancy metric for the at least the portion of the environment based on the first virtual object and one or more other virtual objects associated with facial units defined in the image data.

Example 2 includes the apparatus of example 1, wherein the processor circuitry is to cause the first virtual object to be displayed with a frame of the image data including the first facial unit, the first virtual object to overlay the first facial unit in the frame.

Example 3 includes the apparatus of examples 1 or 2, wherein the processor circuitry is to classify the first facial unit as a pre-identified facial unit based on reference data.

Example 4 includes the apparatus of any of examples 1-3, wherein the processor circuitry is to generate the first virtual object having one of a first characteristic or a second characteristic based on the classification.

Example 5 includes the apparatus of any of examples 1-4, wherein the image data includes a first image and a second image, the first facial unit defined in the first image, and the processor circuitry is to associate a second virtual object with a second facial unit defined in the second image, the occupancy metric based on the first virtual object and the second virtual object.

Example 6 includes the apparatus of any of examples 1-5, wherein the second virtual object is different than the first virtual object.

Example 7 includes the apparatus of any of examples 1-6, wherein the processor circuitry is to determine the occupancy metric based on the first virtual object and adjust the occupancy metric based on the second virtual object.

Example 8 includes a non-transitory computer readable medium comprising instructions that, when executed, cause processor circuitry to at least detect a first face and a second face in one or more frames of image data, the first face corresponding to a first subject in an interior of an air vehicle, the second face corresponding to a second subject in an interior of the air vehicle; define a first facial unit representing the first face in the one or more frames and a second facial unit representing the second face in the one or more frames; cause a first augmented reality marker to overlay the first facial unit in the one or more frames including the first facial unit and a second augmented reality marker to overlay the second facial unit in the one or more frames including the second facial unit; and determine an occupancy metric of the interior of the air vehicle based on the first augmented reality marker and the second augmented reality marker.

Example 9 includes the non-transitory computer readable medium of example 8, wherein the instructions that, when executed, cause the processor circuitry to perform a comparison of the first facial unit to reference data; perform a comparison of the second facial unit to the reference data; assign a first classification to the first facial unit based on the comparison; and assign a second classification to the second facial unit based on the comparison.

Example 10 includes the non-transitory computer readable medium of examples 8 or 9, wherein the first classification represents facial units in the reference data.

Example 11 includes the non-transitory computer readable medium of any of examples 8-10, wherein the first classification is different from the second classification and the instructions that, when executed, cause the processor circuitry to generate the first augmented reality marker having a first property based on the first classification and generate the second augmented reality marker having a second property based on the second classification, the first property different than the second property.

Example 12 includes the non-transitory computer readable medium of any of examples 8-11, wherein the first property includes a first color and the second property includes a second color.

Example 13 includes the non-transitory computer readable medium of any of examples 8-12, wherein the first classification and the second classification are the same classification and the instructions, when executed, cause the processor circuitry to generate the first augmented reality marker having a first property based on the first classification and generate the second augmented reality marker having a second property based on the second classification, the first property and the second property being the same property.

Example 14 includes the non-transitory computer readable medium of any of examples 8-13, wherein the first facial unit and the second facial unit are defined in a first frame of the one or more frames and the instructions that, when executed, cause the processor circuitry to define a third facial unit in a second frame of the one or more frames; perform a comparison of the third facial unit to reference data, the reference data including the first facial unit and the second facial unit; and cause a third augmented reality marker to overlay the third facial unit in the second frame, a property of the third augmented reality marker based on the comparison.

Example 15 includes the non-transitory computer readable medium of any of examples 8-14, wherein the instructions, when executed, cause the processor circuitry to update the occupancy metric based on the third augmented reality marker.

Example 16 includes an apparatus comprising memory; instructions; and processor circuitry to execute the instructions to define one or more facial units representing respective faces of subjects in an environment captured in one or more images based on facial features corresponding to the respective faces; cause a virtual object to be positioned over at least a portion of each facial unit in the one or more images; and determine an occupancy metric for the subjects in the environment based on the virtual objects.

Example 17 includes the apparatus of example 16, wherein the processor circuitry is to classify one or more of the facial units as pre-identified facial units.

Example 18 includes the apparatus of examples 16 or 17, wherein the virtual objects include a first virtual object and a second virtual object, the first virtual object different than the second virtual object, the processor circuitry to cause the first virtual object to be positioned over the one or more facial units classified as pre-identified facial units.

Example 19 includes the apparatus of any of examples 16-18, wherein the processor circuitry is to count respective ones of the first virtual objects and the second virtual objects in the one or more images to determine the occupancy metric.

Example 20 includes the apparatus of any of examples 16-19, wherein the environment includes a cabin of an air vehicle and the occupancy metric includes an occupancy percentage of the cabin.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
memory;
machine-readable instructions; and
at least one processor circuit to execute the machine-readable instructions to:
detect a first face in image data, the image data generated by image sensors in an environment and including at least a portion of the environment, the first face corresponding to a subject in the environment;
define a first facial unit in the image data based on facial features associated with the first face;
associate a first virtual object with the first facial unit in the image data; and
determine an occupancy metric for the at least the portion of the environment based on the first virtual object and one or more other virtual objects associated with facial units defined in the image data.

2. The apparatus of claim 1, wherein one or more of the at least one processor circuit is to cause the first virtual object to be displayed with a frame of the image data including the first facial unit, the first virtual object to overlay the first facial unit in the frame.

3. The apparatus of claim 1, wherein one or more of the at least one processor circuit is to classify the first facial unit as a pre-identified facial unit based on reference data.

4. The apparatus of claim 3, wherein one or more of the at least one processor circuit is to generate the first virtual object having one of a first characteristic or a second characteristic based on the classification.

5. The apparatus of claim 1, wherein the image data includes a first image and a second image, the first facial unit defined in the first image, and one or more of the at least one processor circuit is to associate a second virtual object with a second facial unit defined in the second image, the occupancy metric based on the first virtual object and the second virtual object.

6. The apparatus of claim 5, wherein the second virtual object is different than the first virtual object.

7. The apparatus of claim 5, wherein one or more of the at least one processor circuit is to determine the occupancy metric based on the first virtual object and adjust the occupancy metric based on the second virtual object.

8. A non-transitory computer readable medium comprising machine-readable instructions that cause at least one processor circuit to at least:
detect a first face and a second face in one or more frames of image data, the first face corresponding to a first subject in an interior of an air vehicle, the second face corresponding to a second subject in the interior of the air vehicle;
define a first facial unit representing the first face in the one or more frames and a second facial unit representing the second face in the one or more frames;
cause a first augmented reality marker to overlay the first facial unit in the one or more frames including the first facial unit and a second augmented reality marker to overlay the second facial unit in the one or more frames including the second facial unit; and
determine an occupancy metric of the interior of the air vehicle based on the first augmented reality marker and the second augmented reality marker.

9. The non-transitory computer readable medium of claim 8, wherein the machine-readable instructions are to cause one or more of the at least one processor circuit to:
perform a first comparison of the first facial unit to reference data;
perform a second comparison of the second facial unit to the reference data;
assign a first classification to the first facial unit based on the first comparison; and
assign a second classification to the second facial unit based on the second comparison.

10. The non-transitory computer readable medium of claim 9, wherein the first classification represents facial units in the reference data.

11. The non-transitory computer readable medium of claim 9, wherein the first classification is different from the second classification and the machine-readable instructions are to cause one or more of the at least one processor circuit to generate the first augmented reality marker having a first property based on the first classification and generate the second augmented reality marker having a second property based on the second classification, the first property different than the second property.

12. The non-transitory computer readable medium of claim 11, wherein the first property includes a first color and the second property includes a second color.

13. The non-transitory computer readable medium of claim 9, wherein the first classification and the second classification are the same classification and the machine-readable instructions are to cause one or more of the at least one processor circuit to generate the first augmented reality marker having a first property based on the first classification and generate the second augmented reality marker having a second property based on the second classification, the first property and the second property being the same property.

14. The non-transitory computer readable medium of claim 8, wherein the first facial unit and the second facial unit are defined in a first frame of the one or more frames and the machine-readable instructions are to cause one or more of the at least one processor circuit to:
define a third facial unit in a second frame of the one or more frames;
perform a comparison of the third facial unit to reference data, the reference data including the first facial unit and the second facial unit; and
cause a third augmented reality marker to overlay the third facial unit in the second frame, a property of the third augmented reality marker based on the comparison.

15. The non-transitory computer readable medium of claim 14, wherein the machine-readable instructions are to cause one or more of the at least one processor circuit to update the occupancy metric based on the third augmented reality marker.

16. An apparatus comprising:
memory;
machine-readable instructions; and
at least one processor circuit to execute the machine-readable instructions to:
define facial units representing respective faces of subjects in an environment captured in one or more images based on facial features corresponding to the respective faces;
cause a virtual object to be positioned over at least a portion of each facial unit in the one or more images; and
determine an occupancy metric for the subjects in the environment based on the virtual objects.

17. The apparatus of claim 16, wherein one or more of the at least one processor circuit is to classify one or more of the facial units as a pre-identified facial unit.

18. The apparatus of claim 17, wherein the virtual objects include a first virtual object and a second virtual object, the first virtual object different than the second virtual object, and one or more of the at least one processor circuit to cause the first virtual object to be positioned over the one or more facial units classified as the pre-identified facial unit.

19. The apparatus of claim 18, wherein one or more of the at least one processor circuit is to count respective ones of the first virtual object and respective ones of the second virtual object in the one or more images to determine the occupancy metric.

20. The apparatus of claim 16, wherein the environment includes a cabin of an air vehicle and the occupancy metric includes an occupancy percentage of the cabin.

* * * * *